United States Patent [19]

Rollmann et al.

[11] 4,205,053

[45] May 27, 1980

[54] MANUFACTURE OF NITROGENOUS ZEOLITES

[75] Inventors: Louis D. Rollmann, Princeton, N.J.; Ernest W. Valyocsik, Yardley, Pa.

[73] Assignee: Mobil Oil Corporation, New York, N.Y.

[21] Appl. No.: 8,374

[22] Filed: Feb. 1, 1979

[51] Int. Cl.² .............................................. C01B 33/28
[52] U.S. Cl. ................................ 423/329; 260/448 C; 423/328
[58] Field of Search ................................ 423/328–330; 260/448 C; 252/431 N, 455 Z

[56] References Cited

U.S. PATENT DOCUMENTS

| | | | |
|---|---|---|---|
| 3,941,871 | 3/1976 | Dwyer | 423/328 |
| 4,018,870 | 4/1977 | Whittam | 423/328 |
| 4,025,571 | 5/1977 | Lago | 423/328 |
| 4,025,572 | 5/1977 | Lago | 423/328 |
| 4,061,717 | 12/1977 | Kerr et al. | 423/329 |
| 4,139,600 | 2/1979 | Rollmann et al. | 423/329 |
| 4,151,189 | 4/1979 | Rubin et al. | 260/448 C |

Primary Examiner—Edward J. Meros
Attorney, Agent, or Firm—Charles A. Huggett; Vincent J. Frilette

[57] ABSTRACT

A process for manufacturing synthetic nitrogenous zeolites such as ZSM-5 in which the shape or some other feature of the microscopic crystals is controlled by including in the forming solution an organic basic nitrogen compound in addition to the organic nitrogenous template.

11 Claims, 6 Drawing Figures

ZSM-35
EXAMPLE 2

1.5μ

ZSM-35

EXAMPLE 1

1.5 μ

ZSM-35

EXAMPLE 2

1.5 μ

ZSM-35

EXAMPLE 3

5μ

ZSM-35

EXAMPLE 4

5μ

ZSM-5

EXAMPLE 5

1.0 μ

ZSM-5

EXAMPLE 6

1.5 μ

4,205,053

MANUFACTURE OF NITROGENOUS ZEOLITES

BACKGROUND OF THE INVENTION

1. Field of the Invention

This invention is concerned with a process for manufacturing a synthetic zeolite. In particular, it is concerned with a method for the synthesis of nitrogenous zeolites with control of the shape or other characteristics such as size and discreteness of the synthetic microscopic crystals or aggregates thereof formed during crystallization. It is further concerned with a process for manufacturing highly siliceous zeolites such as ZSM-5.

2. Prior Art

The commercial synthesis of zeolites for use as catalysts and as sorbents has become of substantial importance in the last two decades. The zeolites as that term is herein used, refers to those crystalline inorganic structures formed of three-dimensional arrays of silicon and aluminum tetrahedrally coordinated with oxygen in such a manner as to form a network of well defined pores and channels of near-molecular dimensions. The channels usually are filled with water when the zeolite is crystallized, but after dehydration the pore space thus formed is receptive to a variety of organic guest molecules provided these are not too bulky. Because of the regularity of the crystal structure, dehydrated zeolite crystals exhibit a characteristic sorption behavior sometimes referred to as zeolitic sorption. For further background, the reader is referred to "Zeolite Molecular Sieves" by Donald W. Breck, published by John Wiley & Sons, New York, N.Y. (1974), the entire contents of which are herein incorporated by reference.

With certain zeolites, and under appropriate conditions, catalytic transformation of organic molecules occurs when these are brought into contact with the mineral. These reactions generally are believed to occur within the pores of the crystals. Undoubtedly, the most important catalytic application for zeolites is the catalytic cracking of heavy petroleum oils to gasoline and fuel oil, widely practiced in petroleum refineries, but a number of other reactions, too, have been reported. By way of general background, the reader is referred to "Zeolite Chemistry and Catalysis" Jules A. Rabo, A.C.S. Monograph 171, American Chemical Society, Washington, D.C. (1976), the pertinent portions thereof which refer to catalysis and sorption by zeolites being herein incorporated by reference.

Because the sorption or catalytic transformation of substances by zeolites is effected by the channels within the crystals, the orientation of the channel direction with respect to crystal dimensions, the length of the channel, and most probably even the imperfections in the crystal can favorably or unfavorably affect the efficiency or selectivity of a particular specimen of a zeolite for a particular application. Also, certain steps in the manufacture of the zeolite, such as filtration, or in its subsequent compositing with binders or with a matrix, are likely to be affected by the size, the shape, and the surface smoothness of the crystals. Thus, what is herein designated the "microscopic texture" of a particular specimen of synthetic zeolite is an important characteristic of the specimen. By way of illustration, U.S. Pat. No. 4,025,571 to Lago describes a process for converting monohydric alcohols having up to four carbon atoms or their ethers to a mixture of $C_2$–$C_3$ olefins and monocyclic aromatic hydrocarbons with a catalyst, e.g. ZSM-5, having a crystal size of at least 1 micron. U.S. Pat. No. 4,025,572, also to Lago, describes a process for converting lower alcohols, especially methanol, to a mixture rich in $C_2$–$C_3$ olefins and mononuclear aromatics, and Table III therein shows the effect of crystal size on selectivity for ethylene.

The term "microscopic texture" as used herein refers to the character of the individual crystals of zeolite or aggregates thereof as observed with the electron microscope. A synthetic zeolite crystallizes as a fine powder which exhibits an x-ray diffraction pattern characteristic of that particular type of zeolite. Microscopic examination of two different preparations of the same mineral may show, however, that the individual particles of the two powders are very different, the substantial identity of the x-ray diffraction patterns notwithstanding. For example, the two preparations may differ in crystal shape, or in having predominantly large or predominantly small crystals; and while in one preparation the crystals may be largely discrete, or singly twinned, the other may exhibit multiply twinned crystals even to the extent of forming a honeycomb-like or reticulated structure consisting of many small multiply twinned crystals; and, the crystals of the two preparations may vary in smoothness. Different preparations of mordenite, for example, as noted on page 262 of the hereinabove cited reference on "Zeolite Molecular Sieves" by D. W. Breck, demonstrate such dissimilar microscopic appearances. There is no particular consistency among different authors in the use of terms to describe the microscopic texture of a zeolite specimen. The terms and measures used, however, do relate to one or more observable features including the shape, the size, the degree of smoothness, and the degree of discreteness of the ultimate crystals, and it is in this sense that the term "microscopic texture" is used herein. Further, a reference herein to an alteration in microscopic texture, or to a different microscopic texture, in general will refer to a microscopically observable change or difference in at least the shape of the crystals, or the size of the crystals, or the degree of discreteness of the crystals, or the smoothness of the crystals, and to microscopically observable changes or differences in two or more of these features.

The preparation of synthetic zeolites from aqueous, inorganic compositions is known. In general, the zeolites thus prepared, such as Linde A, X and Y zeolites, and synthetic mordenite, have a $SiO_2/Al_2O_3$ ratio not substantially in excess of 10, and that ratio usually is less than 10, having a value such as 2, or 3, or 4.

In recent years work has been done with zeolite forming solutions which contain organic nitrogenous bases. A zeolite formed from such a solution in some cases is similar in crystal structure to that formed from a strictly inorganic solution, and has a $SiO_2/Al_2O_3$ ratio less than 10. This present invention is not concerned with such zeolites. In other cases, however, the organic nitrogenous base appears to act as a template and a new zeolite structure is formed having a $SiO_2/Al_2O_3$ ratio of at least 12. The development of the foregoing art is briefly summarized in the foregoing reference to "Zeolite Molecular Sieves" by Breck at pages 304–312 inclusive, which pages are herein incorporated by reference. The term "nitrogenous zeolites" as used therein by Breck includes all of the above described zeolites regardless of $SiO_2/Al_2O_3$ ratio. For purposes of the present invention, however, it is to be understood that the term refers only to those synthetic zeolites crystallized with a nitrogenous template in the forming solution and that have a $SiO_2/Al_2O_3$ ratio of at least 12. The use of a mixture of tetramethyl ammonium chloride and tetrapropyl ammonium bromide as template for forming ZSM-5 type material is illustrated by Example 5 of U.S. Pat. No. 3,941,871 issued Mar. 2, 1976. Examples of nitrogenous templates described by Breck include tetramethyl ammonium hydroxide, tetraethyl ammonium hydroxide, tetrapropyl ammonium hydroxide, and 1,4 dimethyl-1,4-diazoniacycle (2.2.2.) octane silicate. However, as used herein, the term nitrogenous template refers to any organic basic nitrogen compound or mixture thereof which is required in a specific forming solution to induce crystallization of a particular zeolite with a $SiO_2/Al_2O_3$ ratio of at least 12.

U.S. Pat. No. 4,018,870 to Whittam describes suppression of the formation of unwanted zeolite contaminants during crystallization by adding to the zeolite forming mixture a basic dye, the mol ratio of dye to $Al_2O_3$ in the aqueous mixture being less than 0.1 to 1. In some recipes the dye causes a new zeolite to form.

It is an object of this invention to provide a process for manufacturing synthetic nitrogenous zeolites wherein large, easily filtered crystals are formed. It is a further object of this invention to provide a process for manufacturing synthetic nitrogenous zeolites particularly useful as catalyst. It is a further object of this invention to control the microscopic texture of a synthetic nitrogenous zeolite. These and other objects will be apparent to one skilled in the art on reading this entire specification including the claims thereof.

DESCRIPTION OF THE INVENTION

Figure 1:
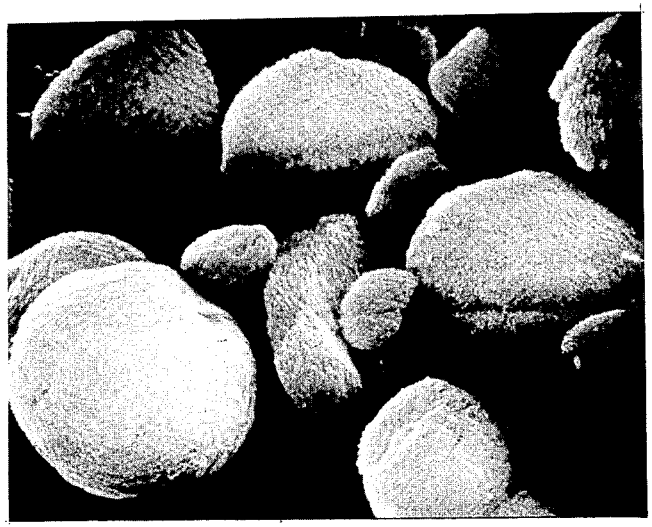
FIG. 1 SEM (Scanning Electron Micrograph) of ZSM-35 without added basic nitrogen compound (Example 1).

It has now been found that the characteristic microscopic texture of a nitrogenous zeolite having a silica to alumina ratio ($SiO_2/Al_2O_3$) of at least about 12 crystallized from an aqueous forming solution that contains a source of $SiO_2$ and a nitrogenous template is altered in a desired way by the addition of a suitable substantially colorless organic basic nitrogen compound to the forming composition. This effect may be achieved without changing the proportions of constituents, including water, in the aqueous forming solution, and without substantially altering the hydrothermal treatment conditions. Thus, the process of this invention provides a facile means for producing said nitrogenous zeolite of a microscopic texture different from the characteristic texture produced from said forming solution under specified hydrothermal conditions, the different texture being advantageous for further processing or for a particular use.

The nitrogenous zeolites that may be made by the process of this invention include zeolite beta, which may have a $SiO_2/Al_2O_3$ ratio of from at least about 12 to 100. The particularly preferred zeolites, however, are those more particularly described hereinbelow and exemplified by ZSM-5 with a $SiO_2/Al_2O_3$ ratio from at least about 12 to 4000 or greater. To make ZSM-5 zeolite having a characteristic texture, a forming solution is prepared with tetrapropyl ammonium hydroxide as the nitrogenous template, the solution having a composition in terms of mole ratios of oxides, falling within the following ranges:

TABLE I

| | Broad | Preferred | Particularly preferred |
|---|---|---|---|
| $OH^-/YO_2$ | 0.07–10.0 | 0.1–0.8 | 0.2–0.75 |
| $R_4N^+/(R_4N^+ + Na^+)$ | 0.2–0.95 | 0.3–0.9 | 0.4–0.9 |
| $H_2O/OH^-$ | 10–300 | 10–300 | 10–300 |
| $YO_2/W_2O_3$ | 5–100 | 10–60 | 10–40 | wherein R is propyl, W is aluminum, and Y is silicon. The forming solution is maintained at 100° to 250° C. until the nitrogenous ZSM-5 crystals are formed. It is to be noted that the solution contains a source of silica and a source of alumina, although the latter may be dispensed with to prepare the highly siliceous varieties, as shown in U.S. Pat. No. 3,941,871 to F. G. Dwyer et al, the entire contents of which are incorporated herein by reference.

The particularly preferred crystalline nitrogenous zeolites prepared by the process of this invention are members of a novel class of zeolites that exhibits unusual properties. Although these zeolites have unusually low alumina contents, i.e. high silica to alumina ratios, they are catalytically very active even when the silica to alumina ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts, generally have low coke-forming activity and therefore are conducive to long times on stream between regenerations by burning with oxygen-containing gas such as air.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anion framework of the crystalline aluminosilicate, the oxygen atoms themselves being bonded to the silicon or aluminum atoms at the centers of the tetrahedra. Briefly, the preferred type zeolites for purposes of this invention possess, in combination: a silica to alumina mole ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred to prepare zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous.

The zeolites prepared by this invention have an effective pore size such as to freely sorb normal hexane. In addition, the structure provides constrained access to larger molecules. It is sometimes possible to judge from a known crystal surface whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although in some instances excessive puckering of the rings or pore blockage may render these zeolites ineffective. Twelve-membered rings usually do not offer sufficient constraint to produce the advantageous catalytic properties.

Rather than attempt to judge from crystal structure whether or not a zeolite possesses the necessary constrained access to molecules larger than normal paraffins, a simple determination of the "Constraint Index" as herein defined may be made by passing continuously a mixture of an equal weight of normal hexane and 3-methylpentane over a small sample, approximately one gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10}(\text{fraction of n-hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of 1 to 12. Constraint Index (CI) values for some typical zeolites are:

| CAS | C.I. |
| --- | --- |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Dealuminized Clinoptilolite | 3.4 |
| Beta | 0.6 |
| ZSM-4 | 0.5 |
| H-Zeolon (mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different Constraint Indexes. Constraint Index seems to vary somewhat with severity of operation (conversion) and the presence or absence of binders. Therefore, it will be appreciated that it may be possible to select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove to have a Constraint Index of 1 to 12 is intended to be included in the instant catalyst definition regardless that the same identical zeolite tested under other defined conditions may give a Constraint Index value outside of 1 to 12.

The class of zeolites defined herein is exemplified by ZSM-5, ZSM-11, ZSM-12, ZSM-23, ZSM-35, ZSM-38, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

The specific zeolites described, as prepared in the presence of organic cations, are substantially catalytically inactive, possibly because the intracrystalline free space is occupied by organic cations from the forming solution. They may be activated by heating in an inert atmosphere at 1000° F. for one hour, for example, followed by base exchange with ammonium salts followed by calcination at 1000° F. in air. The presence of organic cations in the forming solution may not be absolutely essential to the formation of this type zeolite; however, the presence of these cations does appear to favor the formation of this special class of zeolite. More generally, it is desirable to activate this type catalyst by base exchange with ammonium salts formed by calcination in air at about 1000° F. for from about 15 to about 24 hours.

In a preferred aspect of this invention, the zeolites thereof are selected as those having a crystal framework density, in the dry hydrogen form, of not less than about 1.6 grams per cubic centimeter. It has been found that zeolites which satisfy all three of these criteria are most desired for several reasons. When hydrocarbon products or by-products are catalytically formed, for example, such zeolites tend to maximize the production of gasoline boiling range hydrocarbon products. Therefore, the preferred zeolites of this invention are those having a Constraint Index as defined above of about 1 to about 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space. It is possible that the unusual sustained activity and stability of this class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levnite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

It may be desirable to incorporate the above-described crystalline zeolites produced by the process of this invention in another material resistant to the temperature and other conditions to be employed in its use. Such matrix materials include synthetic or naturally occurring substances as well as inorganic materials such as clay, silica and/or metal oxides. The latter may be either naturally occurring or in the form of gelatinous precipitates or gels including mixtures of silica nd metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituents is halloysite, kaolinite, dickite, nacrite or anauxite. Such clays can be used in the raw state as originally mined or initially subjected to calcination, acid treatment or chemical modification.

In addition to the foregoing materials, the zeolites described herein may be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix on any anhydrous basis may vary widely with the zeolite content ranging from between about 1 to about 99 percent by weight and more usually in the range of about 5 to about 80 percent by weight of the dry composite.

In the practice of the present invention, a forming composition for a nitrogenous zeolite having a $SiO_2/Al_2O_3$ ratio is prepared from inorganic constituents and a nitrogenous template in the usual way. The forming composition selected preferably is one which, when treated at a given temperature and pressure, produces a substantially pore zeolite, i.e. a product which has the x-ray diffraction pattern characteristic for that zeolite with no significant contamination by other zeolites. To the forming composition is added a substantially colorless organic basic nitrogen compound having a chemical structure different from said template, i.e. different from the chemical compound or compounds used as template, and more fully described hereinbelow, in an amount effective to alter the microscopic texture of the crystals, i.e. produce crystals having a microscopic texture different from that produced without additive. Most preferably the addition is made prior to any hydrothermal treatment. The hydrothermal treatment of the forming solution containing the organic basic nitrogen compound is then conducted to form the zeolite having the desired microscopic texture.

The substantially colorless organic basic nitrogen compounds useful for the purposes of this invention include those compounds which contain at least one nitrogen atom directly attached to a carbon atom, and which are soluble or dispersible in the aqueous forming solution.

More specifically, the organic basic nitrogen compound is selected from the group consisting of quaternary ammonium compounds having not more than three methyl, three ethyl or three propyl substituents, and amines. The amine may be selected from the group consisting of primary, secondary and tertiary amines, and include those having organyl or hydrocarbyl substituents. The amines may be polybasic, i.e. they may contain more than one basic nitrogen atom in the structure, as in butane diamine, and they may have a heterocyclic structure as in piperazine. In all cases the organic basic nitrogen compound may be employed as the free base or in salt form.

The amines particularly useful in the present invention are those that have a $pK_a$ from about 7 to about 12. As used herein, $pK_a$ is the logarithm of the reciprocal of the equilibrium constant for the reaction:

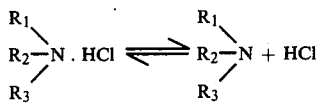

wherein

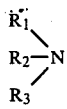

is the amine in free base form and

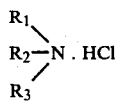

represents the amine hydrochloride. $R_1$, $R_2$ and $R_3$ represent hydrogen or an organyl group, and at least one of these in all cases is organyl with a carbon of said group directly bonded to the nitrogen atom. In all cases the compound or its salt is soluble or at least colloidally dispersible in the aqueous forming solution. It is to be understood that the foregoing $pK_a$ is determined under the usual conditions known to those skilled in the art and used, for example, in compiling tables of such values as found, for example, in the Chemical Rubber Handbook.

The most effective and therefore preferred quaternary ammonium compounds are those of the surfactant type that have an alkyl group containing from 10 to 20 carbon atoms, such as trimethyldecyl ammonium bromide. Such preferred quaternary ammonium compounds have a molecular size greater than the effective pore opening of the preferred zeolites made by this invention, as evidenced by an inability of the outgassed zeolite to sorb or undergo cation exchange with said zeolite.

The organic basic nitrogen compound useful in this invention may be aliphatic or aromatic, but in all cases is characterized by a chemical structure free of strong chromophoric groups which, with the compound in the free base or salt form, would result in markedly reduced transmittance of visible light in the wavelength range of 4000 Angstroms to 7000 Angstroms. More specifically, any specific compound is regarded as substantially colorless for the purpose of this invention if a 5% solution of the pure amine in water or colorless organic solvent appears colorless or almost so when contained in an optical cell not more than 1 centimeter thick when observed by transmitted daylight.

The amount of basic nitrogen compound used in the present invention is from about 0.01 mol to about 0.50 mol per mol of $SiO_2$ in the zeolite forming solution, said amount being effective to produce the desired microscopic texture. In computing the $SiO_2$ content of the forming solution for the purpose of this invention, all reactive or potentially reactive silica contained therein, regardless whether present in the form of dissolved silicate, gelled silcate, silica gel, clay, etc., is assumed present as $SiO_2$. In some instances in the practice of this invention it is observed that use of excess amine severely retards crystallization of the zeolite, and use of such excess is to be avoided. Also to be avoided is the use of those amines which, with a particular forming solution, tend to produce zeolite contaminants which are clearly not of the same kind or formed in the absence of amine.

Amines useful in the present invention include, for example, tributylamine, trimethylamine, diisobutylamine, cyclohexylamine, isobutylamine, diisopropylamine, cycloheptylamine, n-octylamine triethylamine, tert-octylamine, piperidine and piperazine. Ethyl pyridinium bromide and trimethyldecyl ammonium bromide are illustrative of useful quaternary ammonium compounds.

It is not understood why the microscopic texture of the zeolite is modified by the method of this invention. However, without wishing to be bound by theory, it may be speculated that adsorption of the organic compound selectively on one of the growing crystal faces modifies the growth pattern. All of the recited amines or quaternary ammonium compounds may not be equally effective in the process of this invention, and the nature of the modification may be different with different organic compounds, as will be further illustrated hereinbelow. In any case, it is a simple matter to test an organic compound on a laboratory scale at several concentrations to determine the nature of the modification and to estimate an effective amount to use.

Whereas this invention has been described with particular reference to nitrogenous zeolites which usually are aluminosilicates, it is to be understood that contemplated as within the scope of this invention are nitrogenous zeolites formed with gallium or germanium substituting for the aluminum and silicon, respectively. Also contemplated as within the scope of this invention is to utilize an organic basic phosphorus compound or arsenic compound having a $pK_a$ within the range of about 7 to about 12 instead of the organic basic nitrogen compound.

The examples which follow are for the purpose of illustrating the invention described above and are not to be construed as limiting said invention. In the examples all parts are by weight unless specified otherwise.

EXAMPLE 1

A ZSM-35 forming solution was prepared with the following mol ratios of reaction mixture components:
$SiO_2/Al_2O_3 = 30$
$H_2O/SiO_2 = 40$ Na/SiO$_2$=0.6
OH/SiO$_2$=0.2–0.3
Temp/SiO$_2$=0.15 wherein Temp, the nitrogenous organic template, is butane diamine. The sole source of silica was Q-brand sodium silicate, manufactured by Philadelphia Quartz, and the alumina source was Al$_2$(SO$_4$)$_3$.16H$_2$O.

The mixture was maintained at 100° C. under static conditions for from 52 to 110 days, until crystallized.

Examination of the ZSM-35 crystals by SEM (Scanning Electron Micrograph) showed these to be predominantly about 2 micron spheroids. FIG. 1 of the drawing shows a photograph of these crystals made in the conventional manner, i.e. with no basic nitrogen compound other than Temp in the forming mixture.

EXAMPLE 2

Figure 2:
FIG. 2 SEM of ZSM-35 with added trimethyldecyl ammonium added (Example 2).

To the forming solution for ZSM-35 made as described in Example 1 and having the same composition was added sufficient basic nitrogen compound, R, in the form of trimethyldecyl ammonium to provide a mol ratio R/SiO$_2$ of 0.015. Examination of the ZSM-35 crystals after crystallization as in Example 1 showed these to be predominantly 0.1 lamellar intergrowths. A photograph of these is shown in FIG. 2 of the drawing. The product produced the X-ray diffraction pattern of ZSM-35.

EXAMPLE 3

A ZSM-35 forming solution was prepared as in Example 1 except that the nitrogenous organic template in this example was pyrrolidine, and it was incorporated in the molar ratio Temp/SiO$_2$=0.3. The forming solution was crystallized at 160° C. without stirring. The crystals had the X-ray diffraction pattern of ZSM-35.

Figure 3:
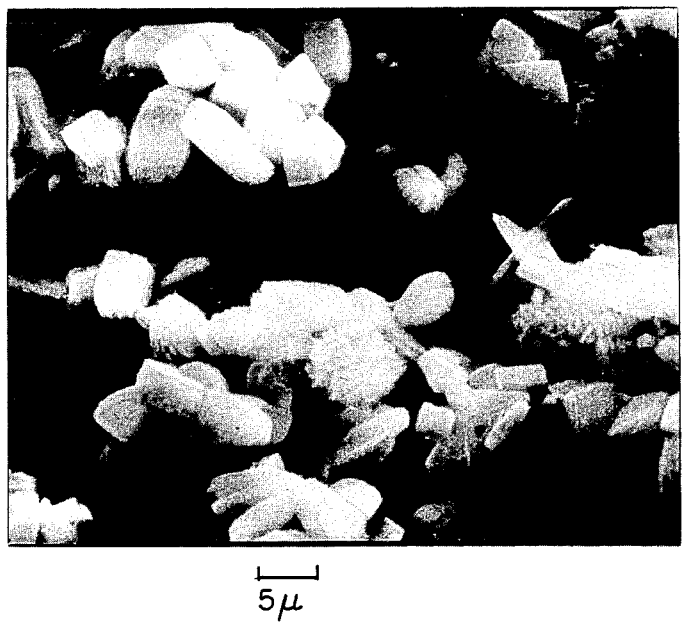
FIG. 3 SEM of ZSM-35 without added basic nitrogen compound (Example 3).

SEM examination of these ZSM-35 crystals made in the absence of basic nitrogen compound additive other than Temp showed them to be predominantly 3–5 micron mica-like crystals, as shown in FIG. 3 of the drawing.

EXAMPLE 4

A forming solution described in Example 3 was prepared and to it was added sufficient basic nitrogen compound, R, in the form of cyclohexylamine to provide a mol ratio R/SiO$_2$=0.17. The mixture was then crystallized as in Example 3.

Figure 4:
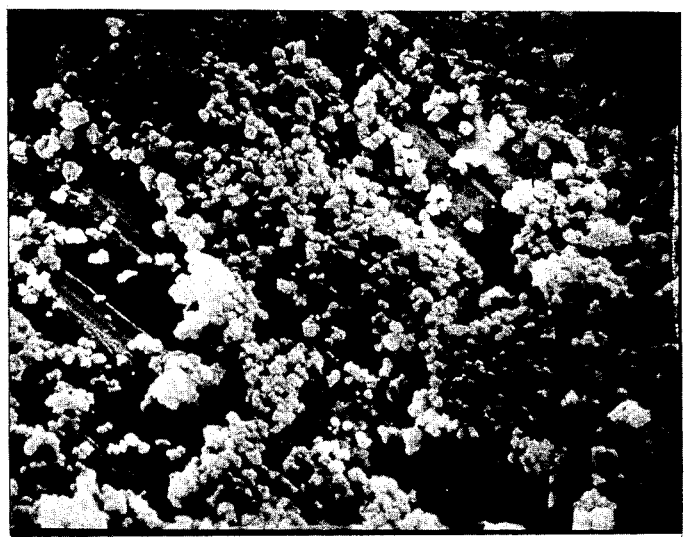
FIG. 4 SEM of ZSM-35 with cyclohexylamine added (Example 4).

SEM examination of the ZSM-35 crystals showed them to be predominantly 0.2–0.5 micron spheroids, as shown in FIG. 4 of the drawing. The crystals had the X-ray diffraction pattern of ZSM-35.

EXAMPLE 5

A ZSM-5 forming solution was prepared with the following mol ratios of reaction mixture components:

SiO$_2$/Al$_2$O$_3$=90
H$_2$O/SiO$_2$=45
Na/SiO$_2$=0.6
OH/SiO$_2$=0.05–0.10
Temp/SiO$_2$=0.1 wherein Temp, the nitrogenous organic template, was tetrapropyl ammonium bromide. The forming solution was crystallized at 100° C., without agitation, for about 31 days.

Figure 5:
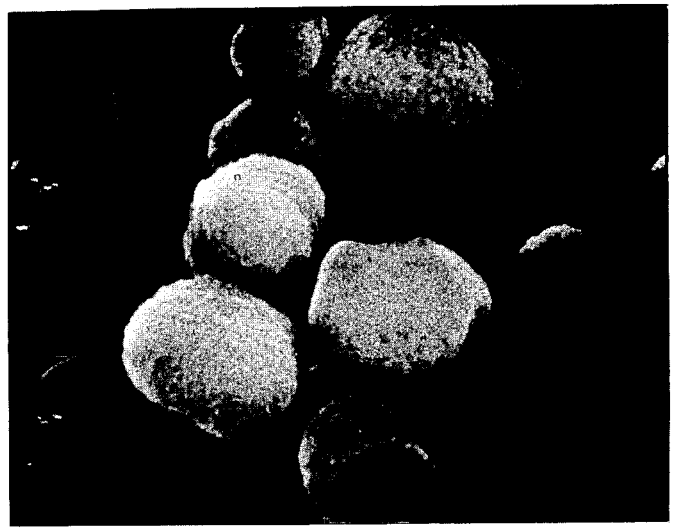
FIG. 5 SEM of ZSM-5 without added basic nitrogen compound (Example 5).

SEM examination of the ZSM-5 crystals showed them to be predominantly 1–2 micron spheroids, as shown in FIG. 5.

EXAMPLE 6

Figure 6:
FIG. 6 SEM of ZSM-5 with n-octylamine added (Example 6).

To a forming solution prepared as in Example 5 was added n-octylamine as basic nitrogen compound, R, to provide a ratio R/SiO$_2$=0.05. The forming solution was crystallized as in Example 5. The ZSM-5 crystals formed in this instance were predominantly 8–9 micron twins, as shown in FIG. 6 of the drawing. X-ray examination of the product confirmed that the crystals were ZSM-5.

EXAMPLES 7–11

To a ZSM-5 forming solution prepared as in Example 5 was added basic nitrogen compound, R, to provide the ratio R/SiO$_2$ as shown in the Summary Table, Examples 7–11. The effect on the microscopic texture of the crystals formed is shown in the Summary Table.

| Summary Table, Examples 7–11 | | | |
|---|---|---|---|
| Example | R | R/SiO$_2$ | Crystals |
| 7 | n-octylamine | 0.01 | 3–4 micron spheroids |
| 8 | cyclohexylamine | 0.05 | 7–8 micron twins |
| 9 | cyclohexylamine | 0.01 | 3–4 micron spheroids |
| 10 | dodecylamine | 0.05 | 7–8 micron twins |
| 11 | dodecylamine | 0.01 | 3–4 micron spheroids |

EXAMPLE 12

To a ZSM-35 forming solution prepared as described in Example 3 was added sufficient trimethyldecyl ammonium bromide to provide a ratio R/SiO$_2$ of 0.03. SEM of the ZSM-35 crystals formed showed them to be predominantly 0.1 micron lamellae.

EXAMPLE 13

Example 4 was repeated with a reduced amount of cyclohexylamine additive such that R/SiO$_2$ was only 0.03. The crystals were 3–5 micron, mica-like, as in Example 3 wherein no basic nitrogen compound was added to the forming solution.

What is claimed is:

1. In a process for manufacturing a synthetic zeolite having a silica to alumina ratio of at least about 12 and a characteristic microscopic texture, which process comprises crystallizing an aqueous forming solution comprising a source of SiO$_2$ and a nitrogenous template, and recovering said synthetic zeolite, the improvement which comprises adding to said forming solution an amount of substantially colorless organic basic nitrogen compound selected from the group consisting of quaternary ammonium compounds having not more than three methyl, three ethyl or three propyl substituents, and amines, said basic nitrogen compound having a chemical structure different from said template, and said amount being effective to alter said microscopic texture.

2. The process claimed in claim 1 wherein said organic base nitrogen compound is an amine having a pK$_a$ from about 7 to about 12, and said effective amount is from about 0.01 mol to about 0.50 mol per mol of said SiO$_2$ in said forming solution.

3. The process claimed in claim 1 wherein said organic basic nitrogen compound is a surfactant quaternary ammonium compound having an alkyl group containing from 10 to 20 carbon atoms, and said effective amount is from about 0.01 mol to about 0.50 mol per mol of said SiO$_2$ in said forming solution.

4. The process claimed in claim 1 wherein said synthetic zeolite is further characterized by a constraint index of 1.0 to 12.0 and a dried crystal density in the hydrogen form of not substantially less than 1.6 grams per cubic centimeter.

5. The process claimed in claim 2 wherein said synthetic zeolite is further characterized by a constraint index of 1.0 to 12.0 and a dried crystal density in the hydrogen form of not substantially less than 1.6 grams per cubic centimeter.

6. The process claimed in claim 3 wherein said synthetic zeolite is further characterized by a constraint index of 1.0 to 12.0 and a dried crystal density in the hydrogen form of not substantially less than 1.6 grams per cubic centimeter.

7. The process claimed in claim 1 wherein said zeolite is ZSM-5 or ZSM-35.

8. The process claimed in claim 3 wherein said basic nitrogen compound is trimethyldecyl ammonium bromide.

9. The process claimed in claim 2 wherein said basic nitrogen compound is cyclohexylamine.

10. The process claimed in claim 2 wherein said basic nitrogen compound is n-octylamine.

11. The proces claimed in claim 2 wherein said basic nitrogen compound is dodecylamine.

* * * * *